a12) United States Patent
Yamamoto

(10) Patent No.: US 9,930,602 B2
(45) Date of Patent: Mar. 27, 2018

(54) COMMUNICATION DEVICE, COMMUNICATION METHOD, AND RECORDING MEDIUM

(75) Inventor: Takeshi Yamamoto, Tokyo (JP)

(73) Assignee: NEC Corporation, Tokyo (JP)

(*) Notice: Subject to any disclaimer, the term of this patent is extended or adjusted under 35 U.S.C. 154(b) by 372 days.

(21) Appl. No.: 14/240,313

(22) PCT Filed: Jun. 29, 2012

(86) PCT No.: PCT/JP2012/066696
§ 371 (c)(1),
(2), (4) Date: Feb. 21, 2014

(87) PCT Pub. No.: WO2013/027490
PCT Pub. Date: Feb. 28, 2013

(65) Prior Publication Data
US 2014/0192765 A1 Jul. 10, 2014

(30) Foreign Application Priority Data
Aug. 24, 2011 (JP) ................. 2011-182596

(51) Int. Cl.
H04W 4/00 (2009.01)
H04W 40/02 (2009.01)
(Continued)

(52) U.S. Cl.
CPC .......... *H04W 40/02* (2013.01); *H04W 40/12* (2013.01); *H04W 72/02* (2013.01);
(Continued)

(58) Field of Classification Search
None
See application file for complete search history.

(56) References Cited

U.S. PATENT DOCUMENTS 8,644,225 B2* 2/2014 Chen ................. H04W 72/0406
370/255
8,995,354 B2* 3/2015 Gossain ................ H04L 45/026
370/255
(Continued)

FOREIGN PATENT DOCUMENTS

CN 101326765 A 12/2008
EP 2341749 A1 7/2011
(Continued)

OTHER PUBLICATIONS

International Search Report corresponding to PCT/JP2012/066696 dated Oct. 2, 2012 (5 pages).
(Continued)

Primary Examiner — Kwang B Yao
Assistant Examiner — Juvena Loo
(74) Attorney, Agent, or Firm — Wilmer Cutler Pickering Hale and Dorr LLP

(57) ABSTRACT

Provided are a communication device, a communication method, and a recording medium that can reduce concentration of a load on one of wireless channels. A communication device that uses wireless channels includes: acceptance means for accepting, from a different communication device and through one of the wireless channels, channel information that indicates wireless channels that can be used by the different communication device; control means for selecting, as a wireless forwarding channel for first information, a wireless channel, which is different from a wireless transmission channel for transmitting the first information, from among the wireless channels that are indicated by the channel information, and for adding second information indicating the wireless forwarding channel to the first information; and transmission means for transmitting the first (Continued)

information provided with the second information by using the wireless transmission channel.

7 Claims, 8 Drawing Sheets

(51) Int. Cl.
*H04W 72/02* (2009.01)
*H04W 40/12* (2009.01)
*H04W 72/04* (2009.01)
*H04W 84/18* (2009.01)
*H04W 88/04* (2009.01)

(52) U.S. Cl.
CPC ........ *H04W 72/0406* (2013.01); *H04W 84/18* (2013.01); *H04W 88/04* (2013.01)

(56) References Cited

U.S. PATENT DOCUMENTS

| | | | |
|---|---|---|---|
| 9,025,518 B2 * | 5/2015 | Lv | H04W 40/246 370/327 |
| 2003/0128701 A1 | 7/2003 | Hurtta | |
| 2003/0198227 A1 * | 10/2003 | Matsuura | H04J 14/0227 370/395.2 |
| 2004/0071127 A1 | 4/2004 | Hurtta | |
| 2007/0098102 A1 * | 5/2007 | Hottinen | H04B 7/15528 375/260 |
| 2007/0124443 A1 | 5/2007 | Nanda et al. | |
| 2007/0223429 A1 * | 9/2007 | Akgun | H04N 7/163 370/338 |
| 2008/0107069 A1 * | 5/2008 | Wu | H04W 72/085 370/329 |
| 2008/0159207 A1 * | 7/2008 | Levine | H04W 16/14 370/329 |
| 2008/0279141 A1 * | 11/2008 | Luss | H04L 45/128 370/329 |
| 2009/0318138 A1 | 12/2009 | Zeng et al. | |
| 2010/0027478 A1 * | 2/2010 | Chu | H04W 72/082 370/329 |
| 2010/0054192 A1 * | 3/2010 | Kim | H04L 45/121 370/329 |
| 2010/0165923 A1 | 7/2010 | Tseng et al. | |
| 2010/0232436 A1 * | 9/2010 | Fujii | H04B 7/2606 370/400 |
| 2011/0189946 A1 | 8/2011 | Fukuzawa et al. | |

FOREIGN PATENT DOCUMENTS

| | | |
|---|---|---|
| JP | 2006-186905 A | 7/2006 |
| JP | 2007-028269 A | 2/2007 |
| JP | 2008-028981 A | 2/2008 |
| JP | 2008-066861 A | 3/2008 |
| JP | 2008-205817 A | 4/2008 |
| JP | 2009-512399 A | 3/2009 |
| JP | 2010-050904 A | 3/2010 |
| KR | 10-2008-0068863 A | 7/2008 |
| WO | WO-03/058892 A1 | 7/2003 |
| WO | WO-2007/047757 A1 | 4/2007 |

OTHER PUBLICATIONS

Yosuke Horibe, Efficient Channel Selection in Multi-Channel Mobiel Ad Hoc Networks, IPSJ SIG Technical Report, Mar. 4, 2004, vol. 2004, No. 24, pp. 87-94.

Extended European Search Report issued by the European Patent Office for Application No. 12825061.0 dated Mar. 10, 2015 (9 pages).

* cited by examiner

COMMUNICATION DEVICE, COMMUNICATION METHOD, AND RECORDING MEDIUM

CROSS-REFERENCE TO RELATED APPLICATIONS

This application is a national stage application of International Application No. PCT/JP2012/066696, filed on Jun. 29, 2012, which claims the benefit of priority to Japanese Patent Application No. 2011-182596, filed Aug. 24, 2011, the disclosures of each of which are hereby incorporated by reference in their entirety.

TECHNICAL FIELD

The present invention relates to a communication device, a communication method, and a recording medium for performing wireless communication, and for example, the present invention relates to a communication device, a communication method, and a recording medium for communication with another communication device mounted on a vehicle as an in-vehicle device.

BACKGROUND ART

Patent Literature 1 describes an in-vehicle communicator that executes vehicle-to-vehicle communication that is communication between one vehicle and another vehicle, and that executes road-to-vehicle communication that is communication between a roadside communicator and a vehicle. The in-vehicle communicator, which is described in Patent Literature 1, uses one of two wireless channels to perform the vehicle-to-vehicle communication and the road-to-vehicle communication.

CITATION LIST

Patent Literature

Patent Literature 1: JP2008-205817A

SUMMARY OF INVENTION

Problem to be Solved by the Invention

Although the in-vehicle communicator described in Patent Literature 1 cannot use two wireless channels at the same time during communication, wireless communication is examined in an ITS (Intelligent Transport System) in which the in-vehicle communicator or the roadside communicator uses wireless channels at the same time.

A load may be concentrated on one of the wireless channels when the wireless channels are used at the same time in order to perform wireless communication. Therefore, a method, which can reduce the concentration of the load on one of the wireless channels, is desired.

An object of the present invention is to provide a communication device, a communication method, and a recording medium that can solve the problem.

Means for Solving the Problem

A communication device according to the present invention is a communication device that uses wireless channels, the communication device including:

acceptance means for accepting, from a different communication device and through one of the wireless channels, channel information that indicates wireless channels that can be used by the different communication device;

control means for selecting, as a wireless forwarding channel for first information, a wireless channel which is different from a wireless transmission channel for transmitting the first information, from among the wireless channels that are indicated by the channel information, and for adding second information that indicates the wireless forwarding channel to the first information; and transmission means for transmitting the first information provided with the second information by using the wireless transmission channel.

A communication device according to the present invention is a communication device that uses wireless channels, the communication device including:

acceptance means for accepting, from a different communication device and through one of the wireless channels, channel information that indicates wireless channels that can be used by the different communication device;

control means for, when forwarding information which is provided with transmission channel information indicating a wireless transmission channel used by a transmission source is received through one of the wireless channels, selecting, as a wireless forwarding channel to be used to forward the forwarding information, a wireless channel that is different from the wireless transmission channel from among the wireless channels of the device, based on the wireless channels indicated by the channel information; and transmission means for forwarding the forwarding information to a forwarding destination by using the wireless forwarding channel.

A communication method according to the present invention is communication method in a communication device that uses wireless channels, the communication method including:

accepting, from a different communication device and through one of the wireless channels, channel information that indicates wireless channels that can be used by the different communication device;

selecting, as a wireless forwarding channel for first information, a wireless channel which is different from a wireless transmission channel for transmitting the first information, from among the wireless channels that are indicated by the channel information, and adding second information that indicates the wireless forwarding channel to the first information; and transmitting the first information provided with the second information by using the wireless transmission channel.

A communication method according to the present invention is a communication method in a communication device that uses wireless channels, the communication method including:

accepting, from a different communication device and through one of the wireless channels, channel information that indicates wireless channels that can be used by the different communication device;

when forwarding information which is provided with transmission channel information indicating a wireless transmission channel used by a transmission source is received through one of the wireless channels, selecting, as a wireless forwarding channel to be used to forward the forwarding information, a wireless channel that is different from the wireless transmission channel from among the wireless channels of the device, based on the wireless channels indicated by the channel information; and forwarding the forwarding information to a forwarding destination by using the wireless forwarding channel.

A computer-readable recording medium according to the present invention is a computer-readable recording medium recording a program for causing a computer that uses wireless channels to execute:

an acceptance procedure of accepting, from a different communication device and through one of the wireless channels, channel information that indicates wireless channels that can be used by the different communication device;

a control procedure of selecting, as a wireless forwarding channel for first information, a wireless channel which is different from a wireless transmission channel for transmitting the first information, from among the wireless channels that are indicated by the channel information, and of adding second information that indicates the wireless forwarding channel to the first information; and a transmission procedure of transmitting the first information provided with the second information by using the wireless transmission channel.

A computer-readable recording medium according to the present invention is a computer-readable recording medium recording a program for causing a computer that uses wireless channels to execute:

an acceptance procedure of accepting, from a different communication device and through one of the wireless channels, channel information that indicates wireless channels that can be used by the different communication device;

a control procedure of, when forwarding information which is provided with transmission channel information indicating a wireless transmission channel used by a transmission source is received through one of the wireless channels, selecting, as a wireless forwarding channel to be used to forward the forwarding information, a wireless channel that is different from the wireless transmission channel from among the wireless channels of the device, based on the wireless channels indicated by the channel information; and a transmission procedure of forwarding the forwarding information to a forwarding destination by using the wireless forwarding channel.

Effects of the Invention

According to the present invention, concentration of a load on any one of wireless channels can be reduced.

MODE FOR CARRYING OUT THE INVENTION

Hereinafter, exemplary embodiments of the present invention will be described with reference to the drawings.

First Exemplary Embodiment

Figure 1:
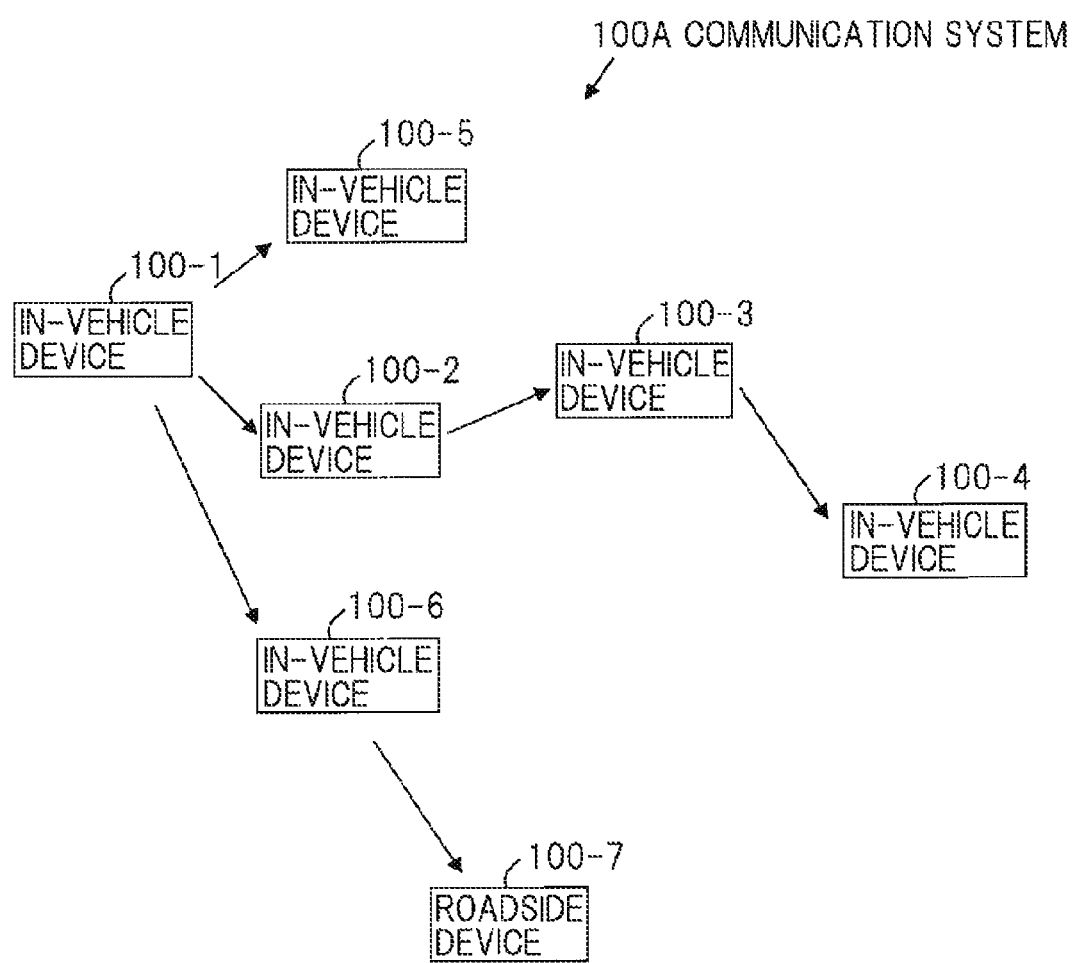
FIG. 1 is a block diagram showing an example of communication system 100A including a communication device according to a first exemplary embodiment.

FIG. 1 is a block diagram that shows an example of communication system 100A including communication devices according to a first exemplary embodiment of the present invention.

Communication system 100A includes in-vehicle devices 100-1 to 100-6 and roadside device 100-7. In-vehicle devices 100-1 to 100-6 and roadside device 100-7 are examples of the communication devices. Although the number of in-vehicle devices is six in FIG. 1, the number of in-vehicle devices is not limited to six, and the number can be appropriately changed. Although the number of roadside device is one, the number of roadside device is not limited to one, and the number can be appropriately changed. In-vehicle devices 100-1 to 100-6 and roadside device 100-7 can directly or indirectly communicate with each other.

Figure 2:
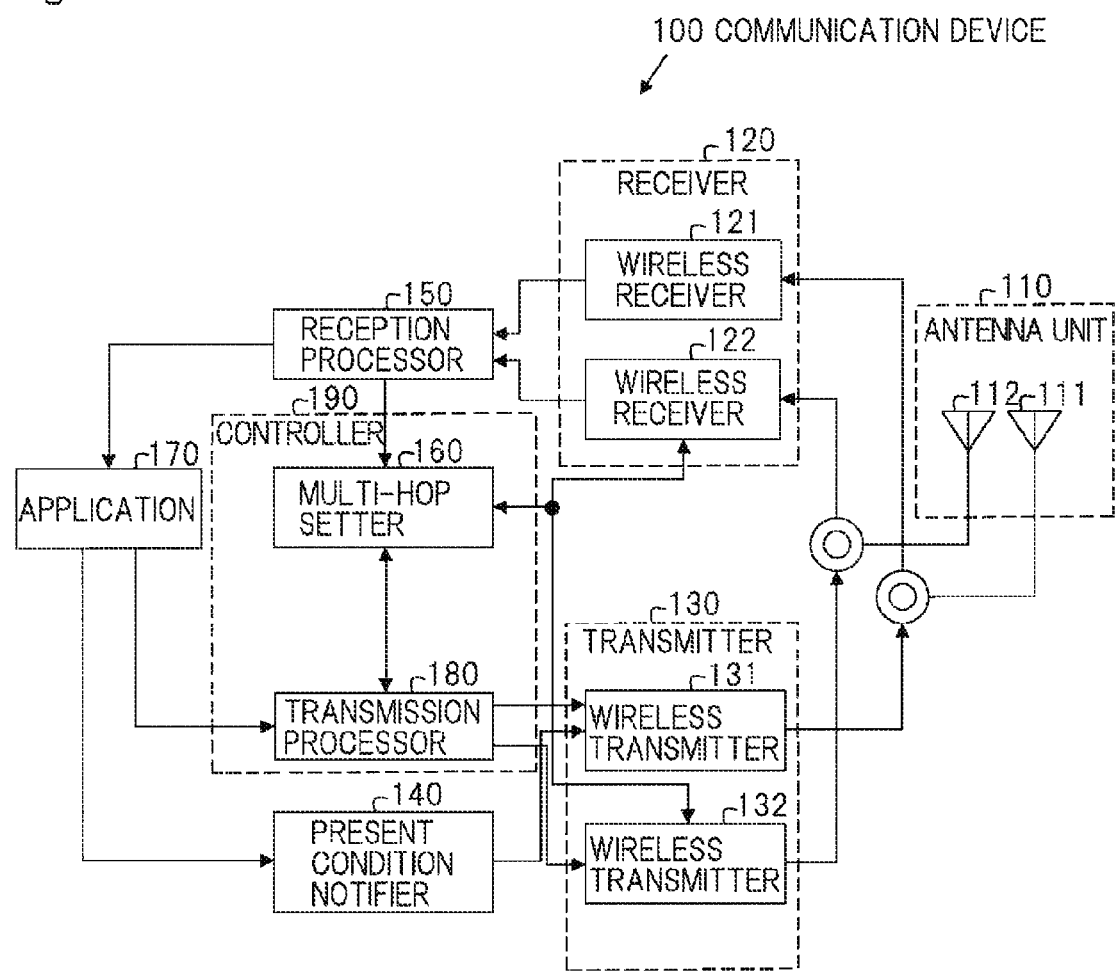
FIG. 2 is a block diagram showing communication device 100.

FIG. 2 is a block diagram that shows communication device 100 used as in-vehicle devices 100-1 to 100-6 or roadside device 100-7.

Communication device 100 uses a plurality of wireless channels at the same time. In the exemplary embodiment, two wireless channels are used as the plurality of wireless channels. The number of wireless channels used at the same time is not limited to two, but can be three or more.

Communication device 100 includes antenna unit 110, receiver 120, transmitter 130, present condition notifier 140, reception processor 150, multi-pop setter 160, application 170, and transmission processor 180. Multi-pop setter 160 and transmission processor 180 are included in controller 190.

Antenna unit 110 includes antennas 111 and 112. Antennas 111 and 112 are general antennas that transmit and receive various packets.

Receiver 120 is an example of acceptance means.

Receiver 120 includes wireless receivers 121 and 122.

Wireless channels with different frequencies are set for wireless receivers 121 and 122 respectively.

In the exemplary embodiment, a CCH (control channel) is set as the wireless channel for wireless receiver 121. The CCH is used to transmit information regarding safety or important information, for example. Meanwhile, any one of SCHs (service channels) with different frequencies is set as the wireless channel for wireless receiver 122. The SCH is used to transmit information regarding comfort, convenience, or amusement, for example.

The wireless channel that is set for wireless receiver 121 is not limited to the CCH, but can be appropriately changed. The wireless channel that is set for wireless receiver 122 is not limited to the SCH, but can be appropriately changed.

Each of wireless receivers 121 and 122 uses antennas 111 or 112 to receive packets transmitted through the wireless channel that is set for wireless receivers 121 or 122. Upon receipt of packets, wireless receivers 121 and 122 output the packets to reception processor 150.

Transmitter 130 is an example of transmission means.

Transmitter 130 includes wireless transmitters 131 and 132.

The same wireless channel (CCH in the exemplary embodiment) as the wireless channel that is set for wireless receiver 121 is set for wireless transmitter 131. Wireless transmitter 131 uses antenna 111 to transmit packets through the wireless channel that is set for wireless transmitter 131.

The same wireless channel (any one of SCHs in the exemplary embodiment) as the wireless channel that is set for wireless receiver 122 is set for wireless transmitter 132. Wireless transmitter 132 uses antenna 112 to transmit packets through the wireless channel that is set for wireless transmitter 132.

Present condition notifier 140 uses wireless transmitter 131 and antenna 111 to transmit a present condition notification packet to a different communication device. Present condition notifier 140 may use wireless transmitter 132 and antenna 112 to transmit a present condition notification packet to a different communication device.

The present condition notification packet is a multi-hop packet forwarded by another communication device. The packet includes; a communication device ID that is identification information of communication device 100, position information that indicates the position of communication device 100, channel information that indicates the wireless channels (CCH and SCHs in the exemplary embodiment) that can be used by communication device 100, and hop quantity information that indicates the hop quantity of the present condition notification packet.

The present condition notification packet also includes information that is necessary for multi-hop communication (for example, information that indicates the destination, information that indicates the number of remaining hops, or transmission area information that indicates the transmission area).

An initial value of the hop quantity information is "1", and the communication device, which executes the forwarding, increases the value by 1 every time the present condition notification packet is forwarded (hopped).

An initial value of the information that indicates the number of remaining hops is "planned number of hops", and the communication device, which executes the forwarding, reduces the value by 1 every time the present condition notification packet is forwarded (hopped). The communication device, which receives a multi-hop packet with the number of remaining hops "0", does not forward the multi-pop packet.

As for the position of communication device 100, for example, present condition notifier 140 may use a GPS (Global Positioning System) to acquire the position of communication device 100, or application 170 may use the GPS to acquire the position of communication device 100 and notify present condition notifier 140 of the acquired result.

Reception processor 150 outputs multi-hop packets (for example, present condition notification packets) from among the packets that are received from wireless receiver 121 and from among the packets that are received from wireless receiver 122, to multi-hop setter 160.

Reception processor 150 also outputs packets that are to be used by application 170, such as a packet that is addressed to communication device 100, a packet that includes the position of communication device 100 in the transmission area that is indicated by the packet, and a packet with the number of remaining hops "0", from among the packets that are received from wireless receiver 121 and from among the packets that are received from wireless receiver 122, to application 170.

Reception processor 150 outputs a packet, which is a broadcast packet and which is also a multi-hop packet, as well as a multi-hop packet with the number of remaining hops "0" from among the packets that are received from wireless receiver 121 and from among the packets that are received from wireless receiver 122, to both multi-hop setter 160 and application 170.

Regarding a present condition notification packet among the multi-hop packets that are received from reception processor 150, multi-hop setter 160 generates a copy of the present condition notification packet and stores the copy (present condition notification packet).

Multi-hop setter 160 checks the destination and the number of hops (the number of remaining hops) described in the multi-hop packets (including the present condition notification packet) that are received from reception processor 150. Multi-hop setter 160 outputs the multi-hop packets, which are received from reception processor 150, to transmission processor 180 if the multi-hop packets need to be forwarded to another communication device.

If forwarding channel designation information that indicates a wireless forwarding channel is added to the multi-hop packets that need to be forwarded to another communication device and if the wireless forwarding channel is neither set for receiver 120 nor transmitter 130, and if the wireless forwarding channel can be set for wireless receiver 122 and wireless transmitter 132, multi-hop setter 160 sets the wireless forwarding channel for wireless receiver 122 and wireless transmitter 132.

Application 170 executes a process according to the packet that is received from reception processor 150.

When application 170 transmits a multi-hop packet designating the number of remaining hops or a multi-hop packet (geocast packet) designating the transmission area, that is to say, when communication device 100 is the transmission source of the multi-hop packet, application 170 outputs the multi-hop packet to transmission processor 180. The multi-hop packet from application 170 also includes information that is necessary for multi-hop communication (for example, information that indicates the destination, information that indicates the number of remaining hops, and transmission area information that indicates the transmission area).

Transmission processor 180 transmits the multi-hop packet, which is received from multi-hop setter 160, from wireless transmitter 131 or 132 through antenna 111 or 112.

For example, if the forwarding channel designation information is added to the multi-hop packet that is received from multi-hop setter 160, transmission processor 180 transmits the multi-hop packet from one of wireless transmitters 131 and 132 in which the wireless channel indicated by the forwarding channel designation information is set, through antenna 111 or 112.

If transmission processor 180 accepts a multi-hop packet from application 170, transmission processor 180 specifies, as a target packet, a present condition notification packet having the hop quantity information "1" among the present condition notification packets in multi-hop setter 160, that is, a present condition notification packet from another communication device that communicates by one hop with communication device 100.

Transmission processor 180 selects, as a wireless forwarding channel of the multi-hop packet, a wireless channel that is different from the wireless transmission channel that is to be used to transmit the multi-hop packet from communication device 100 that is the transmission source, from among the wireless channels indicated by the channel information in the target packet.

For example, the wireless transmission channel of the multi-hop packet whose transmission source is communication device 100 is preset. In the exemplary embodiment, it is assumed that a CCH is set as the wireless transmission channel of the multi-hop packet whose transmission source is communication device 100. The wireless transmission channel of the multi-hop packet whose transmission source is communication device 100 is not limited to the CCH, but can be appropriately changed.

Transmission processor 180 adds forwarding channel designation information (second information) indicating the wireless forwarding channel, to the multi-hop packet that is received from application 170.

Transmission processor 180 transmits the multi-hop packet provided with the forwarding channel designation information, from wireless transmitter 131 or 132 (wireless transmitter 131 in the exemplary embodiment) that is provided with the wireless transmission channel, through antenna 111 or 112 (antenna 111 in the exemplary embodiment).

Controller 190 is an example of control means and forwarding means, and multi-hop setter 160 and transmission processor 180 in controller 190 operate to control the communication using packets.

Next, an operation will be described.

First, an operation when transmitting a present condition notification packet will be described.

Present condition notifier 140 uses transmitter 130 and antenna unit 110 to transmit a present condition notification packet to another communication device.

Next, an operation when receiving a present condition notification packet will be described.

Figure 3:
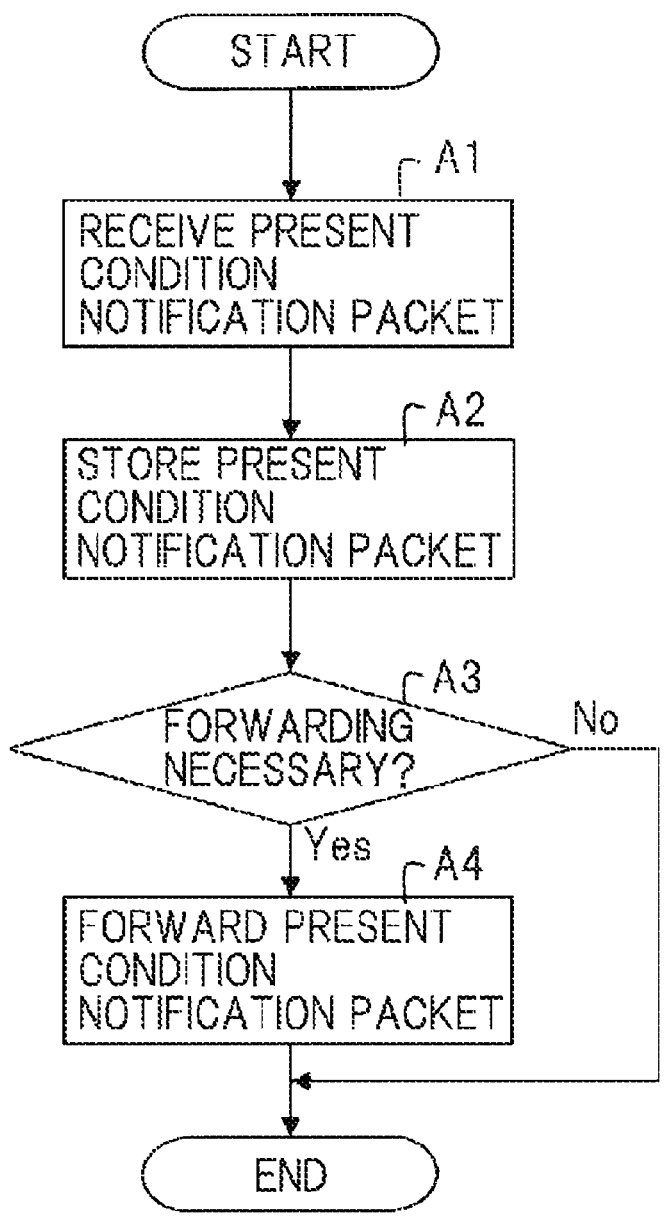
FIG. 3 is a flow chart for describing operation at reception of a present condition notification packet.

FIG. 3 is a flow chart for describing operation when receiving a present condition notification packet.

Upon receipt of a present condition notification packet from another communication device through antenna unit 110 and receiver 120 (step A1), reception processor 150 outputs the present condition notification packet to multi-hop setter 160.

Upon receipt of the present condition notification packet from reception processor 150, multi-hop setter 160 generates a copy of the present condition notification packet and stores the copy (present condition notification packet) (step A2).

When multi-hop setter 160 receives the present condition notification packet from reception processor 150 and if multi-hop setter 160 has already stored a copy of a present condition notification packet with the same communication device ID as the communication device ID in the present condition notification packet that is received, multi-hop setter 160 changes the already stored copy of the present condition notification packet into the copy of the newly accepted present condition notification packet.

If the number of remaining hops indicated by the information in the present condition notification packet is not "0" or if the destination in the present condition notification packet is not communication device 100, multi-hop setter 160 determines that the present condition notification packet needs to be forwarded to another communication device (step A3).

If the present condition notification packet needs to be forwarded to another communication device, multi-hop setter 160 substrates "1" from the present value of the number of remaining hops indicated by the information in the present condition notification packet, and adds "1" to the present value of the hop quantity indicated by the hop quantity information in the present condition notification packet. Subsequently, multi-hop setter 160 outputs the present condition notification packet to transmission processor 180. Upon receipt of the present condition notification packet from multi-hop setter 160, transmission processor 180 uses transmitter 130 (for example, wireless transmitter 131) and antenna unit 100 (for example, antenna 111) to transmit the present condition notification packet to another communication device (step A4). Transmission processor 180 may use wireless transmitter 132 and antenna 112 to forward the present condition notification packet.

On the other hand, if the present condition notification packet does not have to be forwarded to another communication device, that is, if the number of remaining hops indicated by the information in the present condition notification packet is "0", or if the destination in the present condition notification packet is communication device 100 (step A3), the process returns to step A1.

Next, operation when communication device 100 is the transmission source of a multi-hop packet will be described.

Figure 4:
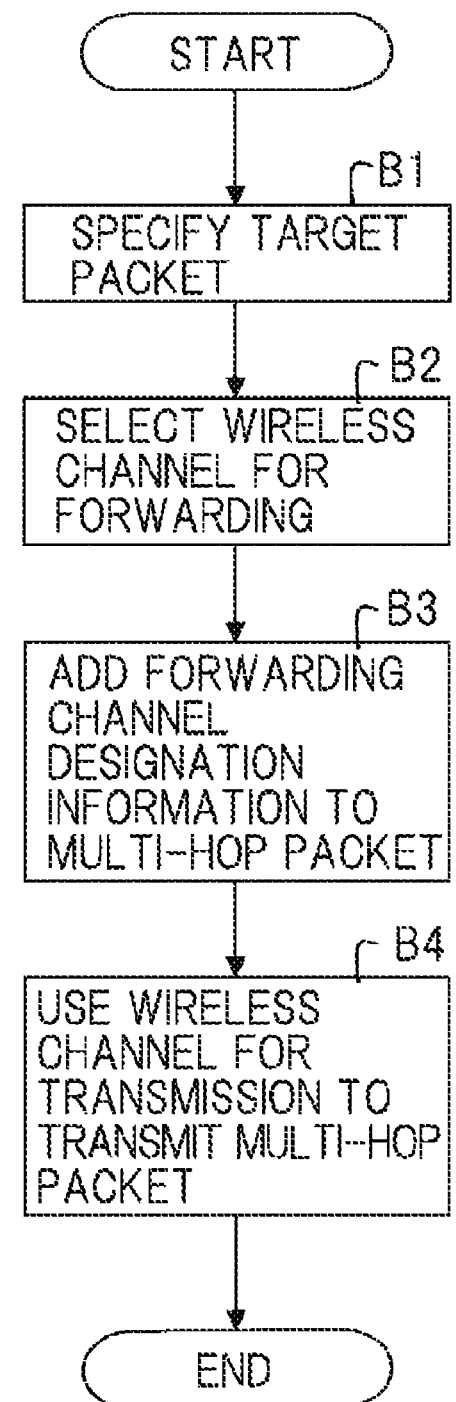
FIG. 4 is a flow chart for describing operation when communication device 100 is a transmission source of a multi-hop packet.

FIG. 4 is a flow chart for describing operation when communication device 100 is the transmission source of a multi-hop packet.

If communication device 100 is the transmission source of a multi-hop packet, application 170 outputs the multi-hop packet to transmission processor 180.

If transmission processor 180 accepts the multi-hop packet from application 170, transmission processor 180 specifies, as a target packet, a present condition notification packet having the hop quantity information "1" from among the present condition notification packets in multi-hop setter 160, that is, a present condition notification packet from another communication device that communicates by one hop with communication device 100 (step B1).

Subsequently, transmission processor 180 selects, as a wireless forwarding channel of the multi-hop packet, a wireless channel that is different from the wireless transmission channel of the multi-hop packet whose transmission source is communication device 100, from among the wireless channels indicated by the channel information in the target packet (step B2).

If there are a plurality of target packets in step B2, transmission processor 180 selects, as a wireless forwarding channel, a wireless channel, the number of which indicated by the channel information in the target packets is the largest, from among the wireless channels which are different from the wireless transmission channel and which are among the wireless channels indicated by the channel information in the target packets.

If there are a plurality of wireless channels, which are different from the wireless transmission channel and which are among the wireless channels indicated by the channel information in the target packet, transmission processor 180 selects one of the wireless channels different from the wireless transmission channel according to a predetermined condition (for example, a condition in which a wireless channel with the highest frequency will be selected or a condition in which a wireless channel with the lowest frequency will be selected) and uses the wireless channel as the wireless forwarding channel of the multi-hop packet.

In step B2, when the multi-hop packet is transmitted to a predetermined transmission area (for example, an area in the travelling direction of communication device 100 or an area in the direction opposite to the travelling direction of communication device 100), that is, when a geocast packet is transmitted, transmission processor 180 operates as follows.

Transmission processor 180 specifies, as reference target packets, from among the target packets, target packets in which the positions indicated by the position information are in the predetermined transmission area, and target packets in which the positions indicated by the position information are in an area between communication device 100 and the predetermined transmission area. The communication device identified by the communication device ID in the reference target packet is an example of a target communication device.

Transmission processor 180 selects, as a wireless forwarding channel, a wireless channel different from the wireless transmission channel, from among the wireless channels indicated by the channel information in the reference target packets. In this case, for example, transmission processor 180 selects, as a wireless forwarding channel, a wireless channel, the number of which indicated by the channel information in the reference target packets is the largest, from among the wireless channels which are different from the wireless transmission channel and which are among the wireless channels indicated by the channel information in the reference target packets.

If there are a plurality of wireless channels, which are different from the wireless transmission channel and which are among the wireless channels indicated by the channel information in the reference target packets, transmission processor 180 selects one of the wireless channels different from the wireless transmission channel according to a predetermined condition, and uses the wireless channel as the wireless forwarding channel of the multi-hop packet.

On selecting the wireless forwarding channel, transmission processor 180 adds the forwarding channel designation information indicating the wireless forwarding channel, to the multi-hop packet from application 170 (step B3).

Subsequently, transmission processor 180 transmits the multi-hop packet provided with the forwarding channel designation information, from wireless transmitter 131 or 132 that is provided with the wireless transmission channel (wireless transmitter 131 in the exemplary embodiment), through antenna 111 or 112 (antenna 111 in the exemplary embodiment).

Next, an operation when receiving a multi-hop packet with forwarding channel designation information will be described.

Figure 5:
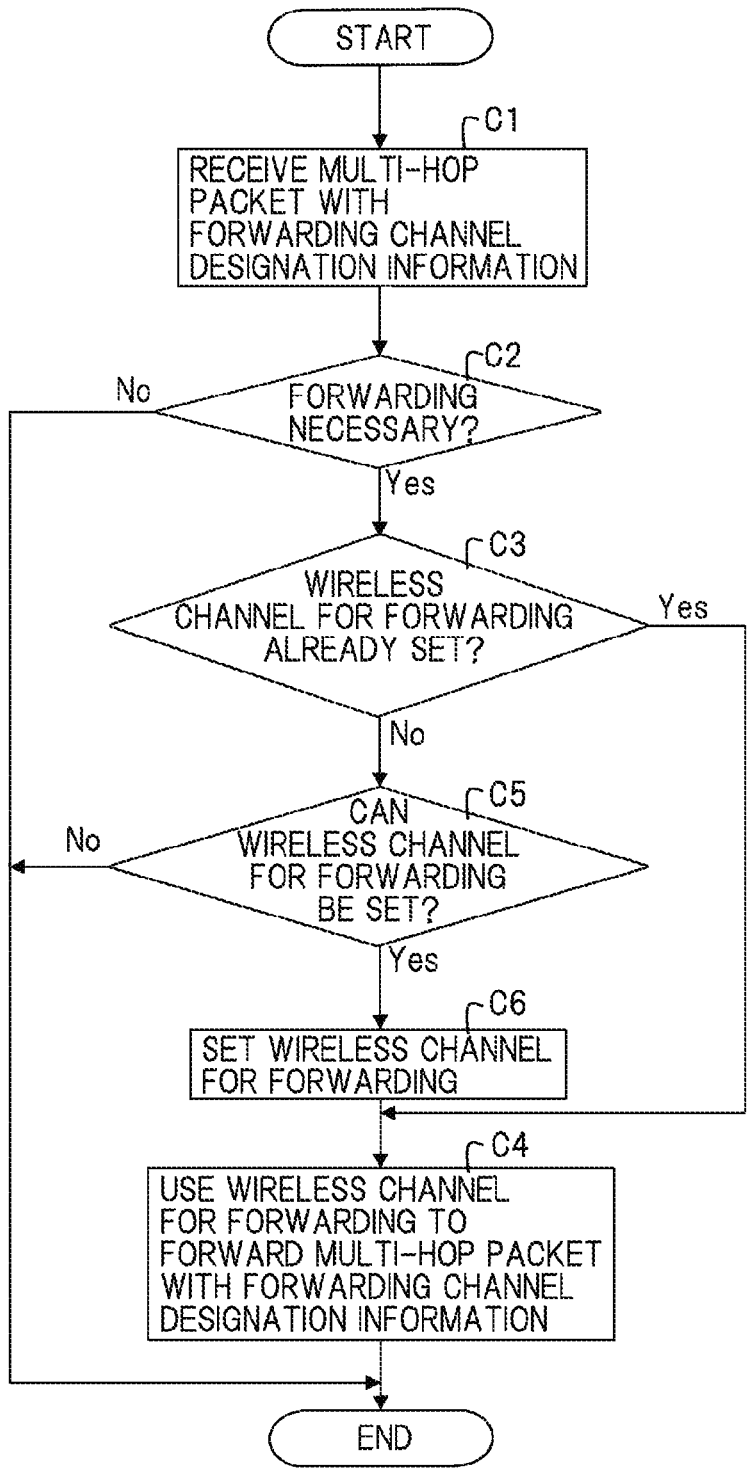
FIG. 5 is a flow chart for describing operation at reception of a multi-hop packet with forwarding channel designation information.

FIG. 5 is a flow chart for describing an operation when receiving a multi-hop packet with forwarding channel designation information.

Upon receipt of a multi-hop packet with forwarding channel designation information from another communication device through antenna unit 110 and receiver 120 (step C1), reception processor 150 outputs the multi-hop packet with forwarding channel designation information to multi-hop setter 160.

Upon receipt of the multi-hop packet with forwarding channel designation information from reception processor 150, multi-hop setter 160 determines that the multi-hop packet with forwarding channel designation information needs to be forwarded to another communication device if the number of remaining hops indicated by the information in the multi-hop packet with forwarding channel designation information is not "0" or if the destination in the multi-hop packet with forwarding channel designation information is not communication device 100 (step C2).

If the multi-hop packet with forwarding channel designation information needs to be forwarded to another communication device, multi-hop setter 160 checks whether the wireless forwarding channel, which is indicated by the forwarding channel designation information that is added to the multi-hop packet, is set for receiver 120 and transmitter 130 (step C3).

If the wireless forwarding channel indicated by the forwarding channel designation information is set for receiver 120 and transmitter 130, multi-hop setter 160 substrates "1" from the present value of the number of remaining hops indicated by the information in the multi-hop packet with forwarding channel designation information, and then outputs the multi-hop packet with forwarding channel designation information to transmission processor 180. Upon receipt of the multi-hop packet with forwarding channel designation information, transmission processor 180 transmits the multi-hop packet with forwarding channel designation information, from wireless transmitter 131 or 132 that is provided with the wireless channel indicated by the forwarding channel designation information, through antenna 111 or 112 (step C4).

On the other hand, if the wireless forwarding channel indicated by the forwarding channel designation information is not set for receiver 120 and transmitter 130 (step C3), multi-hop setter 160 checks whether wireless receiver 122 and wireless transmitter 132 can set the wireless forwarding channel (step C5).

If wireless receiver 122 and wireless transmitter 132 can set the wireless forwarding channel, multi-hop setter 160 sets the wireless forwarding channel for wireless receiver 122 and wireless transmitter 132 (step C6). Subsequently, multi-hop setter 160 subtracts "1" from the present value of the number of remaining hops indicated by the information in the multi-hop packet with forwarding channel designation information, and then outputs the multi-hop packet with forwarding channel designation information to transmission processor 180 thereby executing step C4.

On the other hand, if wireless receiver 122 and wireless transmitter 132 cannot set the wireless forwarding channel, multi-hop setter 160 does not forward the multi-hop packet with forwarding channel designation information.

Figure 6:
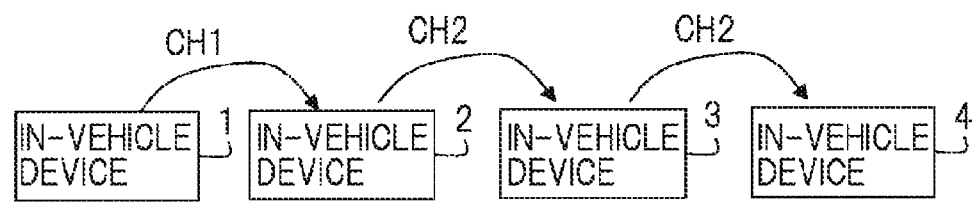
FIG. 6 is a diagram showing an example of forwarding in the first exemplary embodiment.

FIG. 6 is a diagram showing an example of forwarding in the exemplary embodiment.

In FIG. 6, in-vehicle device 1, which is a sender of information, uses channel CH1 (for example, CCH) to transmit the information. In-vehicle devices 2 and 3, which are relay devices, use CH2 (for example, one of SCHs) indicated by the forwarding channel designation information to forward the information. In-vehicle device 4, which is a destination of the information, receives the information.

Next, effects of the exemplary embodiment will be described.

According to the exemplary embodiment, receiver 120 accepts the channel information indicating the wireless channels that can be used by a different communication device, from the different communication device through one of the wireless channels. Controller 190 selects a wireless channel different from the wireless transmission channel of the multi-hop packet (first information) for which the multi-hop communication is performed, as a wireless forwarding channel of the multi-hop packet (first information), from among the wireless channels indicated by the channel information. Controller 190 adds the forwarding channel designation information (second information) indicating the wireless forwarding channel, to the multi-hop packet (first information). Transmitter 130 uses the wireless transmission channel to transmit the multi-hop packet (first information) provided with the forwarding channel designation information (second information).

Therefore, the wireless channel used by the transmission source of the multi-hop packet and the wireless channel used to forward the multi-hop packet can be different wireless channels. As a result, concentration of the load on one of the wireless channels can be reduced.

In the exemplary embodiment, channel information from a communication device (a different communication device) that communicates by one hop with communication device 100 is used as the channel information that is to be used to select the wireless forwarding channel. This can reduce the possibility that the multi-hop packet provided with the forwarding channel designation information is not forwarded to the communication device that communicates by one hop. Channel information from a communication device (another communication device) that communicates by one or more hops with communication device 100 may be used as the channel information used to select the wireless forwarding channel.

In the exemplary embodiment, if acceptor 120 accepts channel information from different communication devices, controller 190 selects, as a wireless forwarding channel, a wireless channel, the number of which indicated by the channel information is the largest, from among the wireless channels different from the wireless transmission channel among the wireless channels indicated by the channel information. This can reduce the possibility that the multi-hop placket provided with the forwarding channel designation information is not forwarded.

In the exemplary embodiment, when the multi-hop packet is transmitted to a predetermined transmission area, controller 190 specifies, as target communication devices, communication devices in which the positions indicated by the position information are in the predetermined transmission area and communication devices in which the positions indicated by the position information are in an area between the device and the predetermined transmission area, from among the other communication devices. Controller 190 selects, as a wireless forwarding channel, a wireless channel different from the wireless transmission channel, from among the wireless channels indicated by the channel information from the target communication devices. Therefore, unnecessary transmission of multi-packets can be prevented while reducing the concentration of the load on one of the wireless channels.

In the exemplary embodiment, upon receipt of the multi-hop packet with forwarding channel designation information from reception processor 150, controller 190 uses the wireless forwarding channel indicated by the forwarding channel designation information to forward the multi-hop packet with forwarding channel designation information to the forwarding destination. Therefore, the wireless channel used by the transmission source of the multi-hop packet and the wireless channel used to forward the multi-hop packet can be different wireless channels. As a result, concentration of the load on one of the wireless channels can be reduced.

Reception processor 150 may further detect the degree of congestion of each of the wireless channels of the device and output the detection result to transmission processor 180 through multi-hop setter 160. Transmission processor 180 may select the wireless transmission channel based on the degree of congestion of the wireless channels of the device. For example, transmission processor 180 selects, as the wireless transmission channel, the wireless channel having the lowest degree of congestion among the wireless channels of the device. In this case, reception processor 150 is an example of detection means.

Communication device 100 may be realized by a computer. In this case, the computer reads and executes programs recorded in a recording medium, such as a computer-readable CD-ROM (Compact Disk Read Only Memory), to function as receiver 120, transmitter 130, present condition notifier 140, reception processor 150, multi-hop setter 160, application 170, and transmission processor 180. The recording medium is not limited to the CD-ROM, but can be appropriately changed.

Second Exemplary Embodiment

Figure 7:
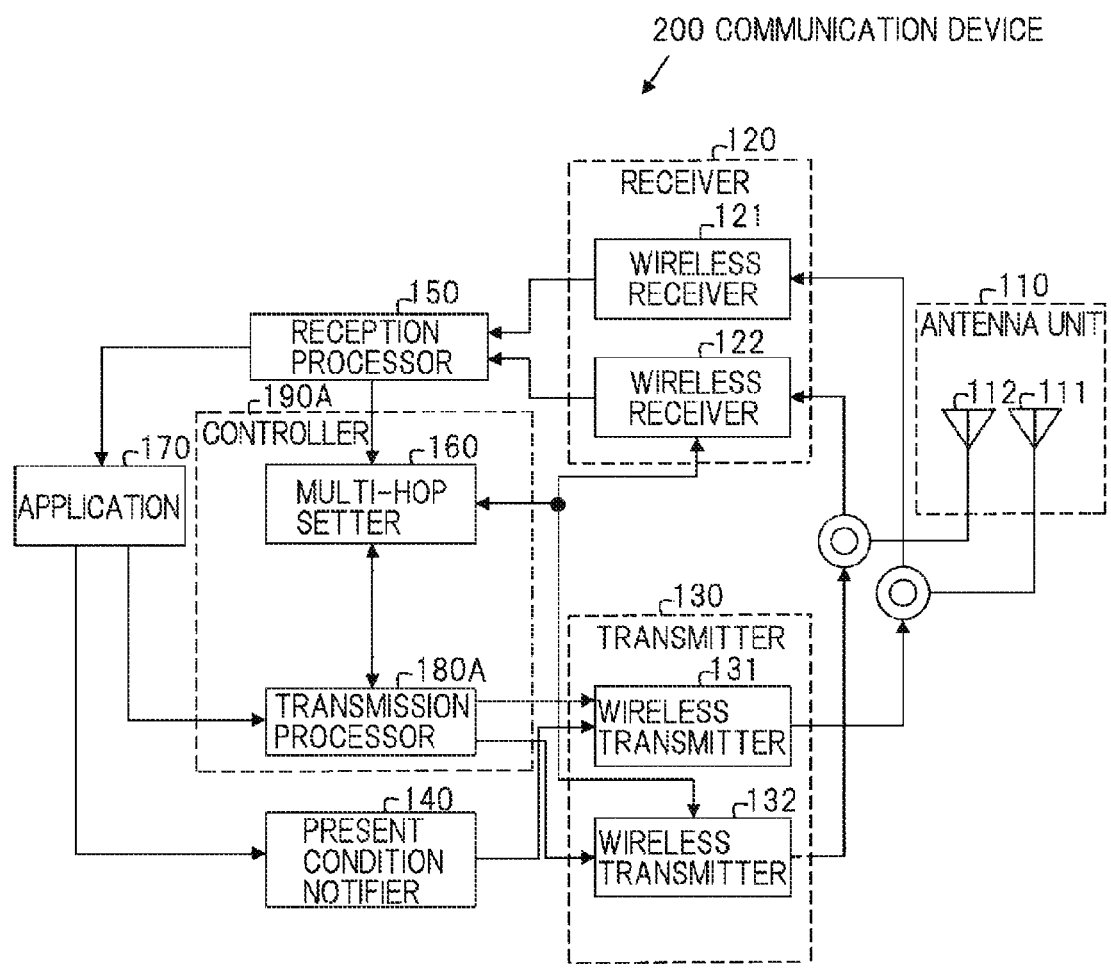
FIG. 7 is a block diagram showing communication device 200 according to a second exemplary embodiment.

FIG. 7 is a block diagram that shows communication device 200 of a second exemplary embodiment according to the present invention. In FIG. 7, the same configurations as illustrated in FIG. 2 are designated with the same reference numerals.

Communication device 200 shown in FIG. 7 is different from communication device 100 shown in FIG. 2 in that transmission processor 180A is included in place of transmission processor 180. Hereinafter, differences from communication device 100 in communication device 200, or more specifically, differences from transmission processor 180 in transmission processor 180A, will be mainly described.

Upon receipt of a multi-hop packet from application 170, that is, if communication device 200 is the transmission source of the packet, transmission processor 180A adds, to the multi-hop packet, transmission channel information that indicates the wireless transmission channel of the multi-hop packet. Transmission processor 180A uses transmitter 130 and antenna unit 110 to transmit the multi-hop packet provided with the transmission channel information.

Upon receipt of a multi-hop packet (hereinafter, called "forwarding information") that needs to be forwarded and that is provided with the transmission channel information from multi-hop setter 160, transmission processor 180A specifies, as a target packet, a present condition notification packet having the hop quantity information "1" among the present condition notification packets in multi-hop setter 160, that is, a present condition notification packet from a different communication device that communicates by one hop with communication device 200.

Based on the wireless channels indicated by the channel information in the target packet, transmission processor 180A selects, as a wireless forwarding channel that is to be used to forward the forwarding information, a wireless channel different from the wireless transmission channel indicated by the transmission channel information, from among the wireless channels of communication device 200.

For example, transmission processor 180A selects, as the wireless forwarding channel, a wireless channel, the number of which indicated by the channel information in the target packets is the largest, from among the wireless channels different from the wireless transmission channel among the wireless channels of communication device 200.

If there are a plurality of wireless channels, which are different from the wireless transmission channel and which are among the wireless channels indicated by the channel information in the target packet, transmission processor 180A selects one of the wireless channels different from the wireless transmission channel according to a predetermined condition (for example, a condition in which a wireless channel having the highest frequency will be selected or a condition in which a wireless channel having the lowest frequency will be selected) and uses the wireless channel as the wireless forwarding channel of the multi-hop packet.

Transmission processor 180A sets the wireless forwarding channel for receiver 120 and transmitter 130 and uses transmitter 130 and antenna unit 110 to forward the forwarding information to the forwarding destination.

Controller 190A is an example of processing means, and multi-hop setter 160 and transmission processor 180A in controller 190A operate to control the communication using packets.

Figure 8:
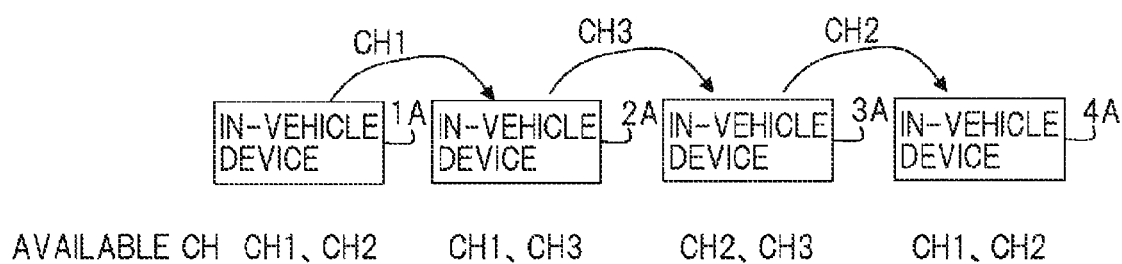
FIG. 8 is a diagram showing an example of forwarding in the second exemplary embodiment.

FIG. 8 is a diagram showing an example of forwarding in the exemplary embodiment.

In FIG. 8, in-vehicle device 1A that is a sender of information includes CH1 and CH2 as usable channels. In-vehicle device 2A that is a relay device includes CH1 and CH3 as usable channels. In-vehicle device 3A that is a relay device includes CH2 and CH3 as usable channels. In-vehicle device 4A that is a destination of the information includes CH1 and CH2 as usable channels. Under the circumstances, FIG. 8 illustrates an example in which in-vehicle device 1A uses channel CH1 to transmit the forwarding information. In the example shown in FIG. 8, in-vehicle device 2A uses channel CH3 as a forwarding channel, and in-vehicle device 3A uses channel CH2 as a forwarding channel.

According to the exemplary embodiment, upon receipt of the forwarding information that is provided with the transmission channel information through one of the wireless channels, controller 190A selects, as a wireless forwarding channel, a wireless channel different from the wireless transmission channel, from among the wireless channels of communication device 200, based on the wireless channels indicated by the channel information from a different communication device. Controller 190A uses the wireless forwarding channel to forward the forwarding information to the forwarding destination.

Therefore, the wireless channel used by the transmission source of the forwarding information and the wireless channel used to forward the forwarding information can be different wireless channels. As a result, concentration of the load on one of the wireless channels can be reduced.

In the exemplary embodiment, the channel information from a communication device (another communication device) that communicates by one hop with communication device 200 is used as the channel information that is to be used to select the wireless channel forwarding. This can reduce the possibility that the forwarding information provided with the transmission channel information is not forwarded to the communication device that communicates by one hop. The channel information from a communication device (another communication device) that communicates by one or more hops with communication device 200 may be used as the channel information used to select the wireless channel for forwarding.

In the exemplary embodiment, controller 190A selects, as the wireless forwarding channel, the wireless channel, the number of which indicated by the channel information from different communication devices is the largest, from among the wireless channels different from the wireless transmission channel among the wireless channels of communication device 200. This can reduce the possibility that the forwarding information provided with the transmission channel information will not be forwarded.

Reception processor 150 may further detect the degree of congestion of each of the wireless channels of the device and output the detection result to transmission processor 180A through multi-hop setter 160. Transmission processor 180A may select the wireless forwarding channel based on the degree of congestion of the wireless channels of the device and based on the wireless channels indicated by the channel information from another communication device. For example, transmission processor 180A selects wireless channels having the degree of congestion equal to or smaller than a predetermined value from among the wireless channels of the device and selects, as the wireless forwarding channel, the wireless channel, the number of which indicated by the channel information from another communication device is the largest, from among the selected wireless channels.

Communication device 200 may be realized by a computer. In this case, the computer reads and executes programs recorded in a computer-readable recording medium to function as receiver 120, transmitter 130, present condition notifier 140, reception processor 150, multi-hop setter 160, application 170, and transmission processor 180A.

Although the number of wireless channels of wireless receiver 121 and wireless transmitter 131 is fixed to one in the exemplary embodiments, the wireless channels of wireless receiver 121 and wireless transmitter 131 may be changeable like wireless receiver 122 and wireless transmitter 132.

Although the present invention has been described with reference to the exemplary embodiments, the present invention is not limited to the exemplary embodiments. Various changes that can be understood by those skilled in the art can be made to the configurations and the details of the present invention within the scope of the present invention.

This application claims the benefit of priority based on Japanese Patent Application No. 2011-182596 filed Aug. 24, 2011, the entire disclosure of which is hereby incorporated by reference.

REFERENCE SIGNS LIST

100A communication system
100-1 to 100-6 in-vehicle devices
100-7 roadside device
100, 200 communication devices
110 antenna unit
111, 112 antennas
120 receiver
121, 122 wireless receivers
130 transmitter
131, 132 wireless transmitters
140 present condition notifier
150 reception processor
160 multi-hop setter
170 application
180, 180A communication processors
190, 190A controllers

What is claimed is:

1. A communication device that uses wireless channels, the communication device comprising:
   an acceptance unit accepting, from a different communication device and through one of the wireless channels, channel information that indicates wireless channels that can be used by the different communication device;
   a control unit selecting, as a wireless forwarding channel for first information, a wireless channel which is different from a wireless transmission channel for transmitting the first information, from among the wireless channels that are indicated by the channel information, and adding second information indicating the wireless forwarding channel to the first information; and
   a transmission unit transmitting the first information provided with the second information by using the wireless transmission channel, wherein when said acceptance unit accepts the channel information of different communication devices, said control unit selects, as the wireless forwarding channel, a wireless channel the number of which indicated by the channel information is the largest, from among the wireless channels, which are different from the wireless transmission channel, that are present among the wireless channels indicated by the channel information, when said acceptance unit accepts the channel information from each of different communication devices, said control unit selects, as the wireless forwarding channel, a wireless channel, which is different from the wireless transmission channel, with a highest frequency or with a lowest frequency, from among the wireless channels that are indicated by the channel information of the different communication devices, said acceptance unit further accepts, from each of the different communication devices through one of the wireless channels, position information indicating a position of each different communication device, and when the first information is to be transmitted to a predetermined transmission area, said control unit specifies, as target communication devices, a communication device whose position indicated by the position information is in the predetermined transmission area, and a communication device whose position indicated by the position information is in an area between the device and the predetermined transmission area, from among the different communication devices, and selects a wireless channel different from the wireless transmission channel as the wireless forwarding channel, from among the wireless channels indicated by the channel information received from the target communication devices.

2. The communication device according to claim 1, wherein
the different communication device is a communication device that communicates by one hop with the device.

3. The communication device according to claim 1, wherein
the wireless transmission channel is preset.

4. The communication device according to claim 1, further comprising
a detection unit detecting a degree of congestion of each of the wireless channels of the device, wherein
said control unit selects the wireless transmission channel based on the degrees of congestion of the wireless channels of the device.

5. A relay device that uses wireless channels, the relay device comprising:
a reception unit receiving first information provided with second information from a communication device through wireless transmission channel, the communication device using wireless channels and comprising:
an acceptance unit accepting, from a different communication device and through one of the wireless channels, channel information that indicates wireless channels that can be used by the different communication device;
a control unit selecting, as a wireless forwarding channel for first information, a wireless channel which is different from a wireless transmission channel for transmitting the first information, from among the wireless channels that are indicated by the channel information, and adding second information indicating the wireless forwarding channel to the first information; and
a transmission unit transmitting the first information provided with the second information by using the wireless transmission channel, wherein
when said acceptance unit accepts the channel information of different communication devices, said control unit selects, as the wireless forwarding channel, a wireless channel the number of which indicated by the channel information is the largest, from among the wireless channels, which are different from the wireless transmission channel, that are present among the wireless channels indicated by the channel information, when said acceptance unit accepts the channel information from each of different communication devices, said control unit selects, as the wireless forwarding channel, a wireless channel, which is different from the wireless transmission channel, with a highest frequency or with a lowest frequency, from among the wireless channels that are indicated by the channel information of the different communication devices, said acceptance unit further accepts, from each of the different communication devices through one of the wireless channels, position information indicating a position of each different communication device, and when the first information is to be transmitted to a predetermined transmission area, said control unit specifies, as target communication devices, a communication device whose position indicated by the position information is in the predetermined transmission area, and a communication device whose position indicated by the position information is in an area between the device and the predetermined transmission area, from among the different communication devices, and selects a wireless channel different from the wireless transmission channel as the wireless forwarding channel, from among the wireless channels indicated by the channel information received from the target communication devices; and a forwarding unit forwarding the first information provided with the second information to a forwarding destination by using the wireless forwarding channel indicated by the second information.

6. A communication method in a communication device that uses wireless channels, the communication method comprising:
accepting, from a different communication device and through one of the wireless channels, channel information that indicates wireless channels that can be used by the different communication device;
selecting, as a wireless forwarding channel for first information, a wireless channel, which is different from a wireless transmission channel for transmitting the first information, from among the wireless channels that are indicated by the channel information, and adding second information that indicates the wireless forwarding channel to the first information;
transmitting the first information provided with the second information by using the wireless transmission channel, wherein
when accepting the channel information of different communication devices, said selecting comprises selecting, as the wireless forwarding channel, a wireless channel the number of which indicated by the channel information is the largest, from among the wireless channels, which are different from the wireless transmission channel, that are present among the wireless channels indicated by the channel information, and when accepting the channel information from each of different communication devices, said selecting comprises selecting, as the wireless forwarding channel, a wireless channel, which is different from the wireless transmission channel, with a highest frequency or with a lowest frequency, from among the wireless channels that are indicated by the channel information of the different communication devices;

accepting, from each of the different communication devices through one of the wireless channels, position information indicating a position of each different communication device; and when the first information is to be transmitted to a predetermined transmission area, specifying, as target communication devices, a communication device whose position indicated by the position information is in the predetermined transmission area, and a communication device whose position indicated by the position information is in an area between the device and the predetermined transmission area, from among the different communication devices, and selecting a wireless channel different from the wireless transmission channel as the wireless forwarding channel, from among the wireless channels indicated by the channel information received from the target communication devices.

7. A non-transitory computer-readable recording medium recording a program for causing a computer that uses wireless channels to execute:

an acceptance procedure of accepting, from a different communication device and through one of the wireless channels, channel information that indicates wireless channels that can be used by the different communication device;

a control procedure of selecting, as a wireless forwarding channel for first information, a wireless channel, which is different from a wireless transmission channel for transmitting the first information, from among the wireless channels that are indicated by the channel information, and of adding second information that indicates the wireless forwarding channel to the first information; and a transmission procedure of transmitting the first information provided with the second information by using the wireless transmission channel, wherein when said acceptance procedure accepts the channel information of different communication devices, said control procedure selects, as the wireless forwarding channel, a wireless channel the number of which indicated by the channel information is the largest, from among the wireless channels, which are different from the wireless transmission channel, that are present among the wireless channels indicated by the channel information, when said acceptance procedure accepts the channel information from each of different communication devices, said control procedure selects, as the wireless forwarding channel, a wireless channel, which is different from the wireless transmission channel, with a highest frequency or with a lowest frequency, from among the wireless channels that are indicated by the channel information of the different communication devices, said acceptance procedure further accepts, from each of the different communication devices through one of the wireless channels, position information indicating a position of each different communication device, and when the first information is to be transmitted to a predetermined transmission area, said control procedure specifies, as target communication devices, a communication device whose position indicated by the position information is in the predetermined transmission area, and a communication device whose position indicated by the position information is in an area between the device and the predetermined transmission area, from among the different communication devices, and selects a wireless channel different from the wireless transmission channel as the wireless forwarding channel, from among the wireless channels indicated by the channel information received from the target communication devices.

\* \* \* \* \*